(12) United States Patent
Lee et al.

(10) Patent No.: US 7,024,020 B2
(45) Date of Patent: Apr. 4, 2006

(54) APPARATUS AND METHOD FOR GENERATING OBJECT-LABELED IMAGE IN VIDEO SEQUENCE

(75) Inventors: Seong-deok Lee, Kyungki-do (KR); Chang-yeong Kim, Kyungki-do (KR); Ji-yeon Kim, Seoul (KR); Sang-kyun Kim, Kyungki-do (KR); Young-su Moon, Seoul (KR); Doo-sik Park, Kyungki-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 562 days.

(21) Appl. No.: 09/944,600

(22) Filed: Sep. 4, 2001

(65) Prior Publication Data

US 2002/0097893 A1 Jul. 25, 2002

(30) Foreign Application Priority Data

Jan. 20, 2001 (KR) .......................................... 2001-3423

(51) Int. Cl.
*G06K 9/00* (2006.01)

(52) U.S. Cl. ........................ 382/103; 382/209; 382/217; 707/104.1; 348/169

(58) Field of Classification Search ................ 345/967; 382/103, 155, 159, 164, 165, 170, 173, 180, 382/181, 203, 209, 215, 217, 218, 224, 236, 382/234; 707/104.1; 348/169–172
See application file for complete search history.

(56) References Cited

U.S. PATENT DOCUMENTS

| | | | |
|---|---|---|---|
| 5,109,435 A | 4/1992 | Lo et al. |
| 5,138,671 A | 8/1992 | Yokoyama |
| 5,500,904 A | 3/1996 | Markandey et al. |
| 5,748,775 A | 5/1998 | Tsuchikawa et al. |
| 5,862,508 A | 1/1999 | Nagaya et al. |
| 5,943,442 A | 8/1999 | Tanaka et al. |

FOREIGN PATENT DOCUMENTS

| | | |
|---|---|---|
| JP | 2002-513487 | 5/2002 |
| WO | 98/50869 | * 11/1998 |

OTHER PUBLICATIONS

Gulrukh Ahanger et al.; Video Query Formulation; 1995; pp. 280–291; SPIE vol. 2420; Bellingham, USA.*
Office Action issued by Japanese Patent Office on Jan. 5, 2005 in a corresponding application.
Kawasaki et al., "Interactive System with Real–World Video Based on Self–Organized Data Structure", D–II, vol. J82–D–II, No. 10, pp. 1561–1571, Oct. 1999 (Summary of IDS (Translation of Extraction).
Office Action issued by Japanese Patent Office on Jan. 5, 2005 in a corresponding application.
Y. Ariki et al., "Indexing and Classification of News Video Articles by Speech, Character and Image Recognition," The Institute of Electronics, Information and Communication Engineers, Technical Report of IEICE, Prmu96–97 (1996–11).

* cited by examiner

*Primary Examiner*—Brian Werner
*Assistant Examiner*—Christopher Lavin
(74) *Attorney, Agent, or Firm*—Buchanan Ingersoll PC

(57) ABSTRACT

An apparatus and method for generating object-labeled images based on query images in a video sequence are provided. A video sequence is divided into a plurality of shots, each of which consists of a set of frames having a similar scene, and an initial object region is extracted from each of the shots by determining whether an object image exists in key frames of the shots. Based on the initial object region extracted from each of the key frames, object regions are tracked in all frames of the shots. Then, the object regions are labeled to generate object-labeled images. Therefore, the object-labeled image generating apparatus and method can be applied regardless of the degree of motion of an object and time required to extract query objects is reduced.

9 Claims, 8 Drawing Sheets

| SHOT NO. | FRAME SIZE PER SHOT | KEY FRAME NO. |
|---|---|---|
| 0 | 107 | 0 |
| 1 | 23 | 107 |
| 2 | 93 | 130 |
| 3 | 42 | 223 |
| 4 | 98 | 265 |
| 5 | 80 | 363 |
| 6 | 44 | 443 |
| 7 | 93 | 487 |
| 8 | 38 | 580 |

FIG. 6
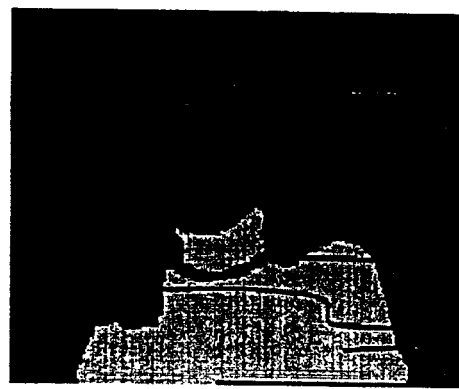
- 551
- 552
- 553
- 554
- 555
FIG. 7
| OBJECT | LABEL NO. |
|---|---|
| BACKGROUND | 0 |
| BLOUSE OF WOMAN | 1 |
| PANTS OF WOMAN | 2 |
| NECKLACE OF WOMAN | 3 |
| ... | ... |
| WHITE CUP | 35 |
| DESK DIARY | 36 |
| ... | ... |
| ... | ... |

| OBJECT | LABEL NO. | CENTROID | POINT p1 | POINT p2 |
|---|---|---|---|---|
| BACKGROUND | 0 | – | – | – |
| BLOUSE OF WOMAN | 1 | (50,100) | (10,50) | (90,150) |
| PANTS OF WOMAN | 2 | (150,200) | (100,150) | (200,250) |
| NECKLACE OF WOMAN | 3 | (60,120) | (55,110) | (65,130) |
| ... | ... | ... | ... | ... |
| WHITE CUP | 35 | (50,50) | (30,20) | (80,80) |
| DESK DIARY | 36 | (50,200) | (20,150) | (70,250) |
| ... | ... | ... | ... | ... |
| ... | ... | ... | ... | ... |

US 7,024,020 B2

APPARATUS AND METHOD FOR GENERATING OBJECT-LABELED IMAGE IN VIDEO SEQUENCE

This application claims priority under 35 U.S.C. §§ 119 and/or 365 to 2001-3423 filed in Republic of Korea on Jan. 20, 2001; the entire content of which is hereby incorporated by reference.

BACKGROUND OF THE INVENTION

1. Field of the Invention

The present invention relates to an apparatus and method for extracting query objects from a video sequence and generating object-label images for the query objects.

2. Description of the Related Art

In conventional technology, query objects are manually extracted from each frame of a moving picture sequence in order to generate object-labeled images in the moving picture. Methods for automatically extracting objects without need for additional operation have been recently announced.

Methods of extracting objects from images include motion based extraction methods and feature based extraction methods. Motion based extraction methods include frame difference based extraction methods, background subtraction based extraction methods, and motion analysis based extraction methods. Frame difference based extraction methods, as disclosed in U.S. Pat. Nos. 5,500,904 and 5,109,435, extract motion by calculating a difference in brightness between continuous frames of an image. In background subtraction methods, as disclosed in U.S. Pat. No. 5,748,775, a background image is recovered by the temporal change of an image feature parameter and an object region is extracted by the difference between an original image and the background image. In motion analysis methods, as disclosed in U.S. Pat. No. 5,862,508, a motion region is extracted by calculating the direction of movement and the speed of a moving object.

However, such object region extraction methods can only be used when the speed of movement of an object is appropriate. It is difficult to apply such methods to a still image, a slow moving object, or a fast moving object.

An approach of using a feature value of an object region includes a template matching method as disclosed in U.S. Pat. No. 5,943,442, a multi-value threshold method as disclosed in U.S. Pat. No. 5,138,671, and a feature value matching method. In order to use these methods in extracting a query object from moving picture data, the methods must be applied to all frames based on query objects. Therefore, a considerable amount of time is required.

SUMMARY OF THE INVENTION

To solve the above-described problems, it is an object of the present invention to provide an apparatus and method for generating object-labeled images in a moving picture, in which query object regions can be automatically extracted in each frame based on key frames without need for additional manual operation and regardless of the degree of motion of an object, and object images labeled based on information of the corresponding query objects are generated in each frame.

To achieve the object of the present invention, there is provided a method for receiving a video sequence including query objects to be extracted and generating object-labeled images based on the query objects, the method comprising the steps of: (a) dividing the video sequence into one or more shots, each of which is a set of frames having a similar scene, and selecting one or more key frames from each of the shots; (b) extracting query object based initial object regions from each of the key frames; (c) tracking object regions in all frames of each of the shots based on the corresponding query image based initial object regions; and (d) labeling the object regions tracked in each of the frames based on information on the corresponding query objects.

To achieve the object of the present invention, there is provided an apparatus for receiving a video sequence including query objects to be extracted and generating object-labeled images based on the query objects, the apparatus comprising: a shot and key frame setting unit for dividing the video sequence into one or more shots, each of which is a set of frames having a similar scene, and selecting one or more key frames from each of the shots; an initial object region extractor for extracting query object based initial object regions from each of the key frames; an object region tracker for tracking object regions in all frames of each of the shots based on the corresponding query image based initial object regions; and an object-labeled image generator for labeling the object regions tracked in each of the frames based on information on the corresponding query objects.

BRIEF DESCRIPTION OF THE DRAWINGS

The above objects and advantages of the present invention will become more apparent by describing in detail preferred embodiments thereof with reference to the attached drawings in which:

FIG. 6 shows an example of an image frame and query objects existing in the frame image;

FIG. 7 shows an example of labeling objects with label numbers;

DETAILED DESCRIPTION OF THE INVENTION

Figure 1:
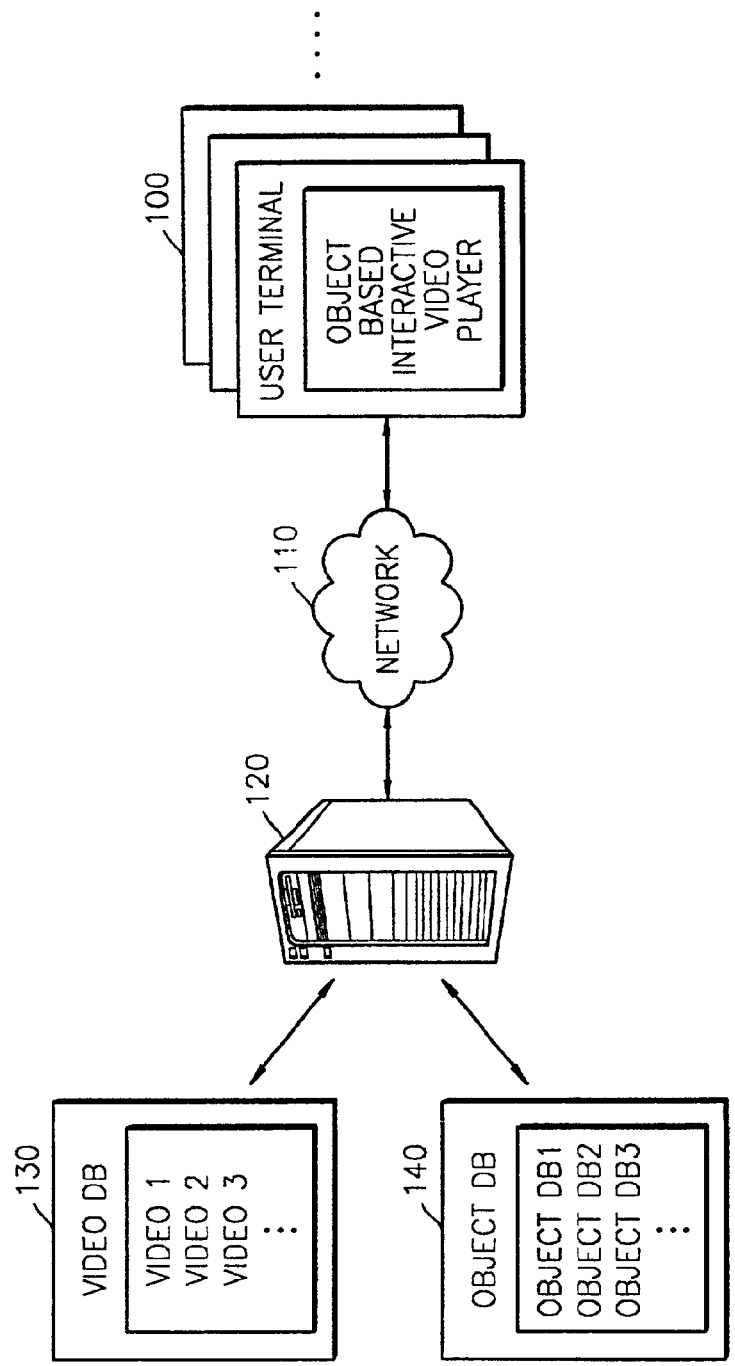
FIG. 1 is a block diagram of an object based interactive service system, to which the present invention is applied.

FIG. 1 is a schematic block diagram of an object based interactive service system, to which the present invention is applied. The object based interactive service system includes user terminals 100, a server 120, a video database (DB) 130 for video sequences, and an object DB 140 for objects of interest.

As an application example according to the present invention, for a service by the object based interactive service system shown in FIG. 1, one or more object regions within moving picture data, which correspond to one or more query objects, are generated as object-labeled images.

Referring to FIG. 1, each of the user terminals 100 includes an object based interactive image player or an MPEG 4 player and is connected to the server 120 through a network 110 in a remote manner. When one of the user terminals 100 is connected to the server 120, a user can watch a moving picture (video sequence) provided by the server 120 on the screen of the user terminal by executing the object based interactive image player. The user can select an arbitrary object (an object of interest) in an arbitrary frame of the video sequence, while watching the same through the object based interactive image player.

The server 120 provides the video sequences stored in the video DB 130 to each of the user terminals 100 and also provides detailed information on the object selected by the user with reference to the object DB 140. At this time, the user can look at information on the selected object through a separate frame (an a frame in the case of the MPEG 4) provided along with RGB (or YUV) frames.

In FIG. 1, the server 120 manages the video DB 130, in which various video sequence data are stored, and the object DB 140, in which information on objects of interest, such as products or persons, included in a particular image of a video sequence is stored. The DBs 130 and 140 can be implemented in the server 120. The interactive service system of FIG. 1 can be realized in web-based circumstances. In this case, the server 120 serves as a web server, and each of the user terminals 100 includes a web browser and is connected to the web server 120 through the Internet 110. Hereinafter, an apparatus and method for generating an object-labeled image in a video sequence according to the present invention will be described.

Figure 2:
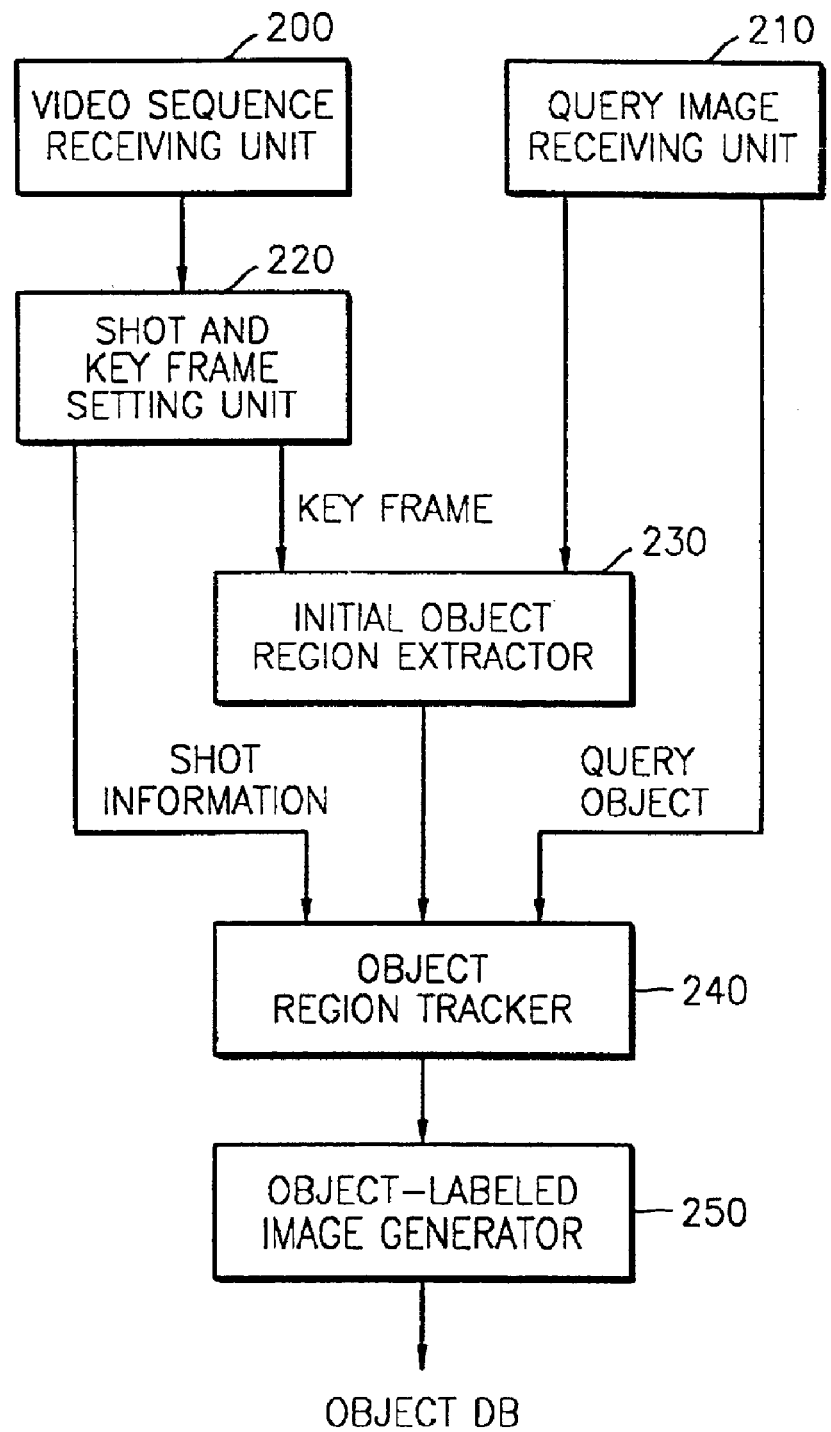
FIG. 2 is a block diagram showing an apparatus for generating an object-labeled image according to the present invention.

FIG. 2 is a block diagram of the object-labeled image generating apparatus according to the present invention. The object-labeled image generating apparatus includes a video sequence receiving unit 200, a query image receiving unit 210, a shot and key frame setting unit 220, an initial object region extractor 230, an object region tracker 240, and a object-labeled image generator 250.

Referring to FIG. 2, the video sequence receiving unit 200 receives a video sequence, i.e., a series of frame data of three primary colors, such as a series of RGB (or YUV) images, and outputs the received image sequence to the shot and key frame setting unit 220. Here, the video sequence is a set of frames. Each of the frames may be an image including a query object or an image without any query object.

The shot and key frame setting unit 220 divides the input video sequence into one or more shots, each of which is a set of frames having a similar scene, and outputs information on the divided shots, i.e., information on frames which constitute each of the shots, to the object region tracker 240. Also, the shot and key frame setting unit 220 selects a key frame (a representative (R) frame) from each of the shots, which represents the shot. Here, the number of key frames for a single shot may be one or more.

The initial object region extractor 230 sequentially receives query images each including a query object from the query image receiving unit 210 and receives the key frame of each of the shots from the shot and key frame setting unit 220. The initial object region extractor 230 determines whether the key frame for each of the shots includes an object corresponding to the query object of the query image input from the query image receiving unit 210, extracts an initial object region corresponding to the query object from the key frame of each of the shots, and masks the area of the initial object region as a binary image, a gray-scale image, etc., to generate a shot mask image. After generating the shot mask image corresponding to each of the query objects for all the key frames, the shot mask images are output to the object region tracker 240.

The object region tracker 240 receives the shots divided from the original video sequence, the query images each including one query object, and the shot mask images. The object region tracker 240 tracks object regions in all frames of each of the shots based on the initial object regions. Specifically, object regions for all the frames of each of the shots are tracked based on the corresponding initial object regions extracted based on the query objects. If an object region exists in a frame, the location and area of the object region in the frame are identified, and the area of the object region is masked as a binary image, a gray-scale image, etc., to generate a frame mask image. This object region tracking is performed on all the frames of the shots and is repeated until the frame mask images for all query objects are made.

The object-labeled image generator 250 merges the frame mask images tracked based on the query objects in each frame and labels one or more query objects existing in each of the frames. Specifically, the query object based frame mask images for each of the frames are merged as a single object-labeled image frame in which all objects are labeled. Assuming that a frame includes, for example, three query objects, the object regions corresponding to the three query objects may be marked with a peculiar pixel value between 1 and 255 and the other pixel region without any object may be marked with "0" (OFF).

Information on the object-labeled image frames generated by the object-labeled image generator 250 and information on real objects corresponding to the labeled object images are stored in the object DB 140 shown in FIG. 1.

Figure 3A:
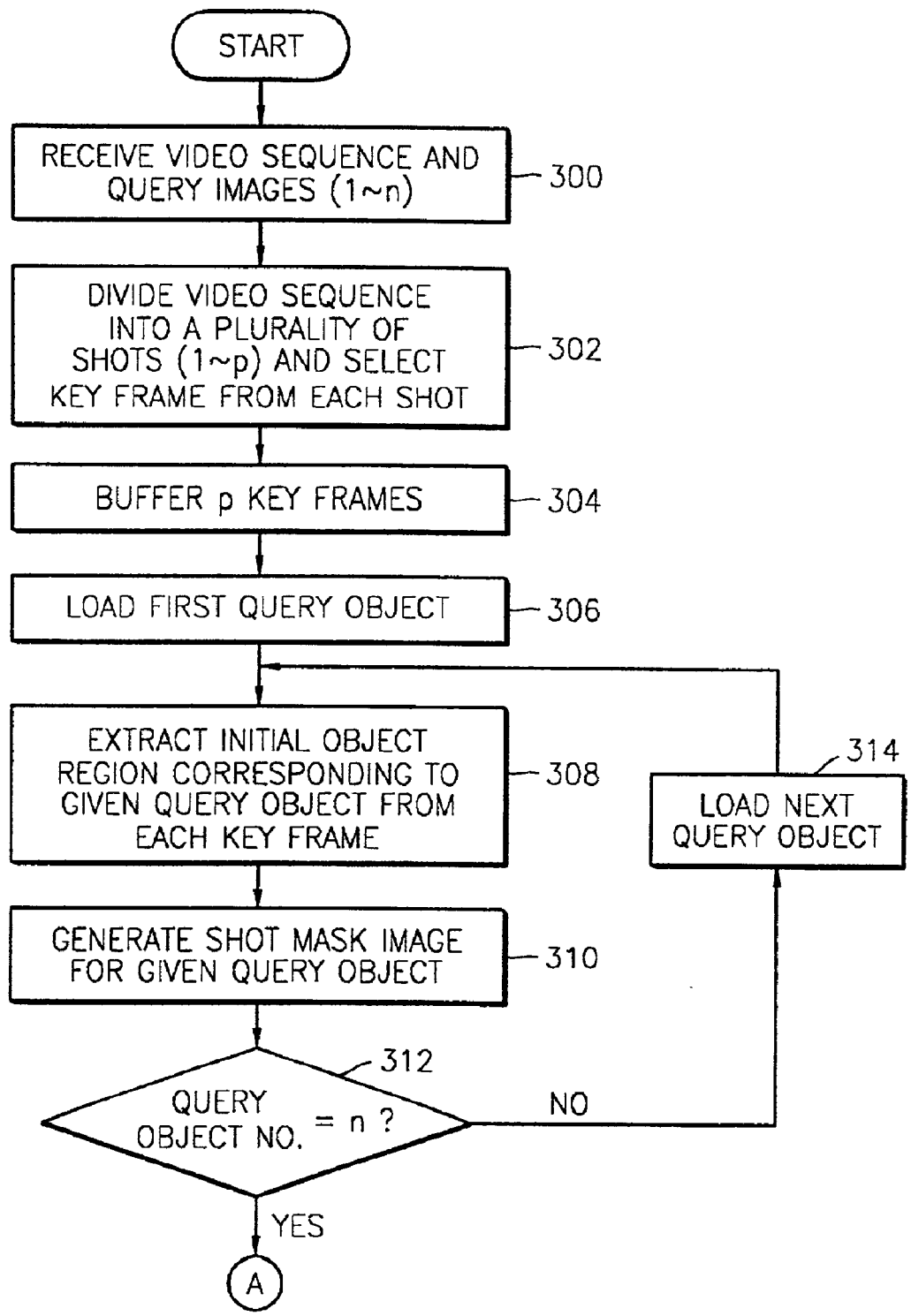
FIGS. 3A and 3B are flowcharts illustrating a method for generating an object-labeled image according to the present invention.
Figure 3B:
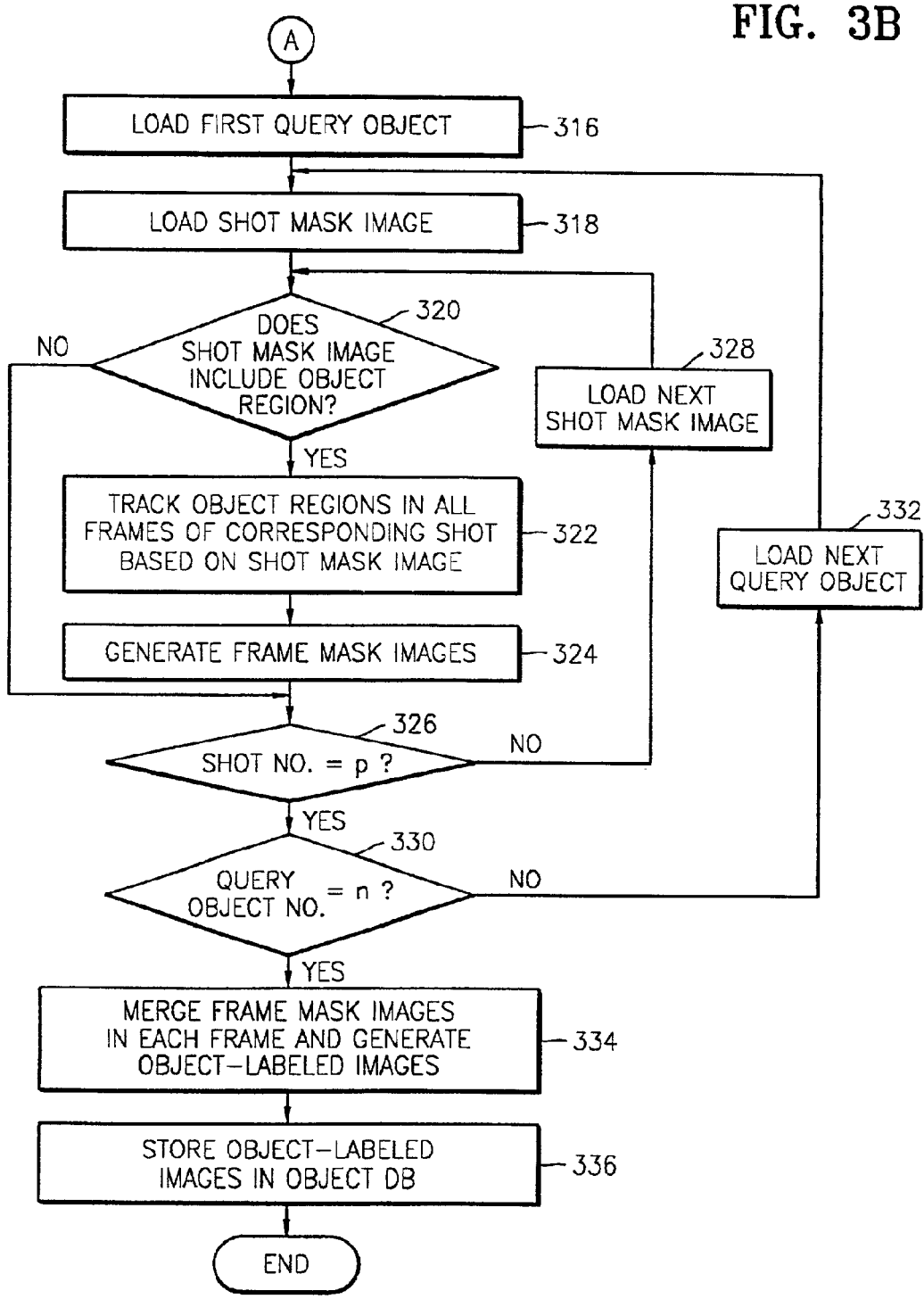

FIGS. 3A and 3B are flowcharts illustrating an object-labeled image generating method according to the present invention. The operation of the object-labeled image generating apparatus of FIG. 2 will be described in detail with reference to FIGS. 3A and 3B.

A video sequence from which a query object is to be extracted is divided into one or more shots each of which is a set of frames having a similar scene, and one or more key frames are selected from each of the shots (steps 300 through 304). In general, one video sequence can be divided into a plurality of shots according to changes in camera angle, persons or subjects, place, and illumination. Variations between the shots are greater than those, for example, in color values, between the frames which constitute each of the shots and can be detected from a difference in color between two frames, i.e., the key frames, of the shots of interest. One of the frames constituting each of the shots is selected as a key frame. The first or middle frame of each of shots is selected as the key frame. In the present invention, only the key frame of each of the shots is used to determine whether a query object exists in each of the shots. For example, if there are p shots, the number of key frames is equal to p.

Figures 4, 5:
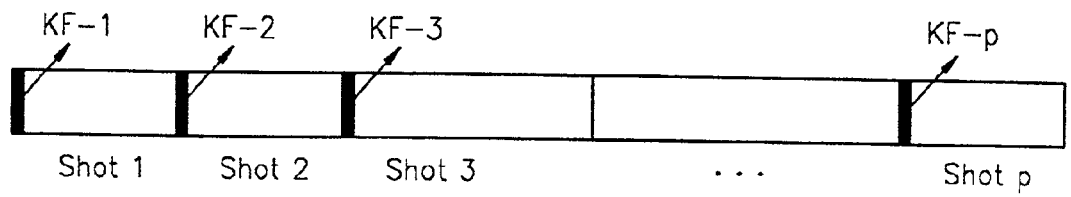
FIG. 4 shows an example of a video sequence divided into p shots and their key frames.
FIG. 5 shows an example of a video sequence divided into 9 shots and their key frames.

To be specific, in FIG. 3A, a video sequence and query images (1 through n) are input (step 300). The video sequence is divided into one or more shots (1 through p), a key frame is selected in each of the shots (step 302). Next, p key frames are buffered (step 304). FIG. 4 shows an example of a video sequence divided into p shots and their key frames. In FIG. 4, the first frame is selected from each of the shots as key frames KF-1, KF-2, KF-3, . . . , and KF-p. FIG. 5 shows an example of dividing a video sequence extracted from a soap opera into 8 shots and selecting their key frames. In FIG. 5, the video sequence consisting of 619 frames in total are divided into 9 shots, and the key frame of each of the shots is designated by frame number.

An object region is extracted from each of the key frames based on query objects (steps 306 through 312). Preferably, it is determined whether an object similar to a query object exists in each of the query objects based on color histogram or features such as texture or structure of the multi-color regions constituting objects.

To be specific, n query objects are input one by one. A first query object is loaded (step 306). It is checked whether an object similar to the first query object exists in each of the p key frames, and if such an object exists, the object is extracted as an initial object region for the corresponding key frame (step 308). Pixels which belong to the initial object region of the key frame are turned on ("1") and the remaining pixels are turned off ("0"), thereby generating a shot mask image for the key frame (step 310). It is determined whether the query object number is greater than n (step 312). If not, the next query object is loaded (step 314). The above-mentioned operations are repeated with respect to n query objects.

To be specific, n×p shot mask images are created with respect to p key frames and n query objects (the pixels of the shot mask image without the object region are all turned off ("0")).

Object regions are tracked with respect to all the frames of each of the shots based on the initial object regions (steps 316 through 330). The initial object regions, which are extracted from each of the key frames of the shots based on the query images in previous processes, are extended over the remaining frames of each of the shots. In particular, using the shot mask image extracted from each of the key frames of the shots as an initial mask, location and area (range) of an object region corresponding to the query object are tracked in all the frames of each of the shots based on information on color of the query image corresponding to the query object. A more accurate object region can be extracted by checking similarity between the tracked object regions and using both motion model and color information, by considering changes in location and area of the object image.

To be specific, in the state where the first query object is loaded (step 316), a shot mask image for the first query image is loaded (step 318). When the pixels of the loaded shot mask image are turned off ("0"), i.e., when it is determined that the loaded shot mask image does not include an object region corresponding to the first query image (step 320), the next shot mask image is loaded (step 328). In particular, if it is determined that the loaded shot mask image does not include the object region corresponding to the first query image, it is determined whether the shot number is greater than p (step 326). If the shot number is not greater than p, the next shot mask image is loaded (step 328). Meanwhile, when it is determined that the object region exists in the loaded shot mask image, the object region is tracked in all the frames of the corresponding shot (step 322), thereby generating frame mask images for the corresponding shot based on the first query object (step 324). The above-described operations are repeated with respect to all the shots and with respect to all the query objects (steps 330 and 332).

The frame image masks based on the query objects are merged in each frame, and the query object regions existing in each of the frames are labeled (step 334). When an input video sequence consists of m frames and each of the frames includes n query objects, n-by-m frame mask images can be generated through the previous processes and can be merged in m frames. However, actually all the frames do not include n query objects and thus the number of generated frame mask images is less than n-by-m. Each of the query objects has a peculiar color value between 0 and 255 and pixels of the query object regions, which correspond to the query objects, existing in the merged frames have the unique color value assigned to the corresponding query object.

FIG. 6 shows an example of a frame image and query objects existing in the frame image. In FIG. 6, an arbitrary frame image shown on the left has a plurality of query objects, such as a desk diary 552, a necklace 553, a cup 554, a cloth 555, and a background 551.

FIG. 7 shows an example of labeling objects with label numbers. As shown in FIG. 7, each of the query objects has a unique label number. Thus, when the frame mask images generated based on the query objects are merged in each frame, each of the frame mask images is labeled with the corresponding unique label number, as shown on the right of FIG. 7.

Figures 8, 9:
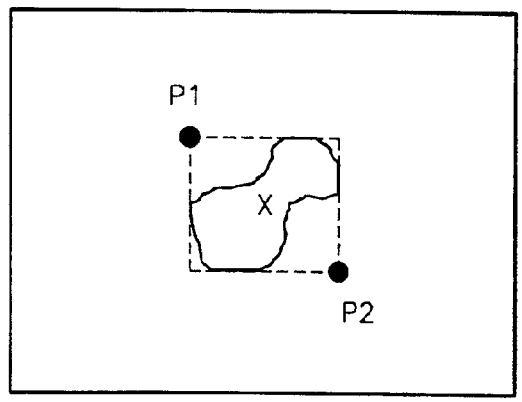
FIG. 8 shows an example where an object is labeled with the centroid and the minimum area rectangle.
FIG. 9 shows an example of object labeling using the centroid and the coordinate values of the minimum area rectangle of FIG. 8.

FIG. 8 shows an example where an object is labeled with the centroid and the minimum area rectangle. As another method of representing an object region, the centroid of the object region, which is marked with "X", and the minimum area rectangle enclosing or enclosed within the object region in a frame can be used instead of the unique label number. Here, P1 and P2 denote diagonally opposite corners of the rectangle. FIG. 9 shows an example of object labeling using the centroid and the coordinate values of the minimum area rectangle of FIG. 8.

According to the present invention, a video sequence is divided into a plurality of shots, each of which consists of a set of frames having a similar scene, and an initial object region is extracted from each of the shots by determining whether an object image exists in key frames of the shots. Based on the initial object region extracted from each of the key frames, object regions are tracked in all frames of the shots. Then, the object regions are labeled to generate object-labeled images. Therefore, compared with a conventional method of extracting objects and generating object-labeled images, the present invention can be applied regardless of the degree of motion of an object and time required to extract query objects can be reduced. Also, the present invention can easily be applied to provide object based interactive services without need for additional manual operations.

Figure 10:
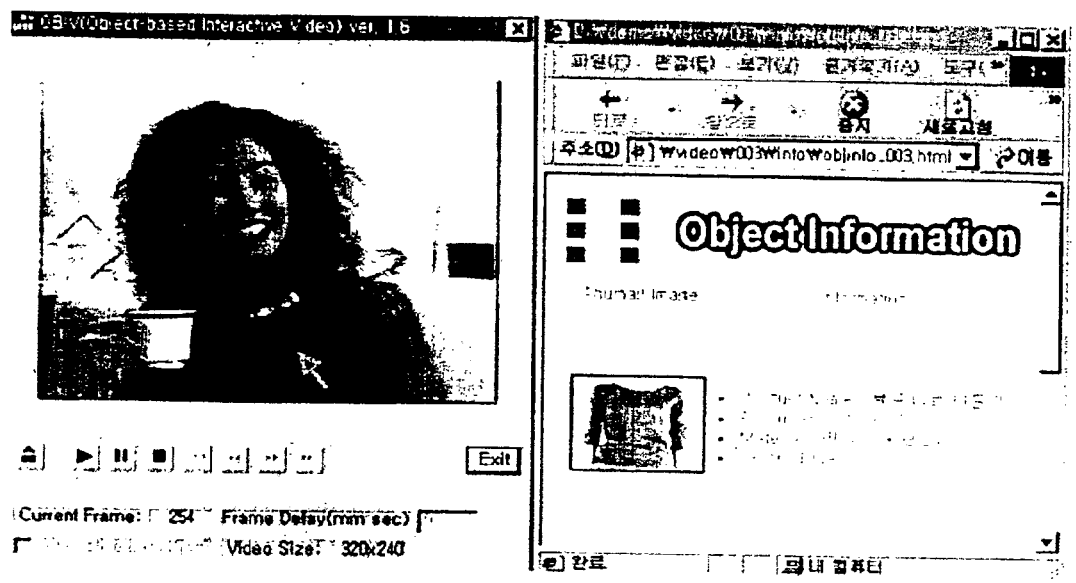
FIG. 10 shows an embodiment of an object based interactive service using the present invention.

FIG. 10 shows an embodiment of an object based interactive service using the present invention. Object images existing in each frame are labeled into object-labeled images and stored in the object DB 104 described with reference to FIG. 1. When a user clicks on, for example, an arbitrary portion of the woman's blouse in an arbitrary frame, as shown on the left side of FIG. 10, using an object based interactive player, the user's browser is provided with information on an object corresponding to the clicked object image, which is stored in the object DB 104. The right side of FIG. 10 shows an example of information on the object.

The invention may be embodied in a general purpose digital computer by running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). The present invention may be embodied as a computer usable medium having a computer readable program code unit for distributed computer systems connected through a network.

As described above, in the apparatus and method for generating object label images in a video sequence according to the present invention, the frame mask images generated based on the query objects are merged in each frame, and thus time required to extract a plurality of query objects from a frame can be reduced, compared to the conventional object extraction method. Therefore, the present invention can easily be applied in creating, editing, and encoding moving picture data based on objects. The present invention can widely be used in interactive Internet broadcasting, and can be adopted to prepare Internet based advertisement materials, contents, and as a writing tool.

While the this invention has been particularly shown and described with reference to preferred embodiments thereof, it will be understood by those skilled in the art that various changes in form and details may be made therein without departing from the sprit and scope of the invention as defined by the appended claims.

What is claimed is:

1. A method for receiving a video sequence including query objects to be extracted and generating object-labeled images based on the query objects, the method comprising the steps of:
   (a) dividing the video sequence into one or more shots, each of which is a set of frames having a similar scene, and selecting one or more key frames from each of the shots;
   (b) determining whether there exists an object similar to each of the query objects in each of the key frames and extracting the similar objects as corresponding query object based initial object regions from each of the key frames;
   (c) for each query object, tracking object regions in all frames of only shots determined to have a respective similar object in a key frame based on the corresponding query object based initial object regions; and
   (d) labeling the object regions tracked in each of the frames based on information on the corresponding query objects.

2. The method of claim 1, wherein step (b) comprises:
   generating query object based shot mask images in all key frames of the shots by setting pixels of the query object based initial object regions extracted from each of the key frames as a first value and setting the remaining pixels of each of the key frames as a second value.

3. The method of claim 2, wherein step (c) comprises:
   (c1) tracking the object regions in all frames of each of the shots based on the corresponding query image based shot mask images and video feature values of the corresponding query objects; and
   (c2) generating query object based frame mask images in all frames of each of the shots by setting pixels of the object regions tracked in each of the frames as a first value and setting the remaining pixels of each of the key frames as a second value.

4. The method of claim 3, wherein, in step (d), each of the object regions is labeled in each frame with a unique number set to the corresponding query image or coordinate information of the corresponding query image in each frame.

5. An apparatus for receiving a video sequence including query objects to be extracted and generating object-labeled images based on the query objects, the apparatus comprising:

a shot and key frame setting unit for dividing the video sequence into one or more shots, each of which is a set of frames having a similar scene, and selecting one or more key frames from each of the shots;
   an initial object region extractor for determining whether there exists an object similar to each of the query objects in each of the key frames and extracting the similar objects as corresponding query object based initial object regions from each of the key frames;
   an object region tracker for tracking, for each query object, object regions in all frames of only shots determined to have a respective similar object in a key frame based on the corresponding query image object based initial object regions; and
   an object-labeled image generator for labeling the object regions tracked in each of the frames based on information on the corresponding query objects.

6. The apparatus of claim 5, wherein the initial object region extractor generates query object based shot mask images in all key frames of each of the shots by setting pixels of the query object based initial object regions extracted from each of the key frames as a first value and setting the remaining pixels of each of the key frames as a second value.

7. The apparatus of claim 6, wherein the object region tracker tracks the object regions in all frames of each of the shots based on the corresponding query image based shot mask images and video feature values of the corresponding query objects, and generates query object based frame mask images in all frames of each of the shots by setting pixels of the object regions tracked in each of the frames as a first value and setting the remaining pixels of each of the key frames as a second value.

8. The apparatus of claim 5, wherein the object-labeled image generator labels each of the object regions in each frame with a unique number set to the corresponding query image or coordinate information of the corresponding query image in each frame.

9. A computer readable medium having embodied thereon a computer program for receiving a video sequence including query objects to be extracted and generating object-labeled images based on the query objects, wherein generating object-labeled images comprises the steps of:
   (a) dividing the video sequence into one or more shots, each of which is a set of frames having a similar scene, and selecting one or more key frames from each of the shots;
   (b) determining whether there exists an object similar to each of the query objects in each of the key frames and extracting the similar objects as corresponding query object based initial object regions from each of the key frames;
   (c) for each query object, tracking object regions in all frames of only shots determined to have a respective similar object in a key frame based on the corresponding query object based initial object regions; and
   (d) labeling the object regions tracked in each of the frames based on information on the corresponding query objects.

* * * * *